US000001818H

United States Statutory Invention Registration [19]

[11] Reg. Number: H1,818

Potgieter et al.

[45] Published: Nov. 2, 1999

[54] DETERGENT AND CLEANING COMPOSITIONS DERIVED FROM NEW DETERGENT ALCOHOLS

[75] Inventors: Ignatius Hendrik Potgieter, Vanderbijlpark; Annmarie Elizabeth Buck, Sunninghill; Mark Justin Betts, Parkwood, all of South Africa

[73] Assignee: Sasol Technology (Proprietary) Limited, Johannesburg, South Africa

[21] Appl. No.: 08/953,175

[22] Filed: Oct. 17, 1997

[51] Int. Cl.[6] ..... C11D 17/00

[52] U.S. Cl. ..... 510/422

*Primary Examiner*—Charles T. Jordan
*Assistant Examiner*—Meena Chelliah
*Attorney, Agent, or Firm*—Baker & Daniels

[57] ABSTRACT

Detergent and/or cleaning compositions incorporating a wide range of surfactants derivable from new $C_9$–$C_{15}$ detergent alcohols obtainable from Sasol.

28 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DETERGENT AND CLEANING COMPOSITIONS DERIVED FROM NEW DETERGENT ALCOHOLS

FIELD OF THE INVENTION

The present invention is in the field of detergent compositions deriving from certain new detergent alcohols. More particularly, the invention relates to detergent compositions containing nonionic alkoxylates, anionic sulphates, or anionic alkoxysulphates derived from the alcohols; to mixtures of any of such surfactants, and to detergent and cleaning compositions made therewith, such as gel-form, liquid-form, powder-form, paste-form and tablet-form laundry detergents, dishwashing products, personal cleansing products, hard-surface cleaners, bar soaps and the like.

BACKGROUND OF THE INVENTION

The hydroformylation of olefins into aldehydes (oxo synthesis) was discovered by Roelen in 1938 and has thus long been known for the synthesis of fatty alcohols. Aldehydes made by hydroformylating long-chain olefins are readily hydrogenated into primary alcohols. See "Higher Oxo Alcohols", Lewis F. Hatch, Wiley, New York, 1957; and "New Syntheses with Carbon Monoxide", Ed. J. Falbe, Springer-Verlag, New York, 1980. Hydroformylation (including suitable catalysts) and the conventional conversion of the resulting alcohols into anionic surfactants such as alkyl sulphates and alkyl alkoxysulphates are also described in "Anionic Surfactants—Organic Chemistry", Volume 56 of the Surfactant Science Series, Marcel Dekker, New York, 1996, all the foregoing references hereby being incorporated in their entirety. Nonionic surfactants, such as the products of ethoxylating the alcohols, are also available using conventional ethoxylation. See "Nonionic Surfactants", Volume 1 of the Surfactant Science Series, Marcel Dekker, New York, 1966 and "Surface Active Ethylene Oxide Adducts", N. Schönfeldt, Pergamon Press, New York, 1969, these volumes and the enclosed references where pertinent being incorporated in their entirety.

Sasol manufactures olefins using Fischer-Tropsch technology which has been shown to be suitable for the manufacture of detergent alcohols, and thereby, a wide range of surfactants. The F-T process was developed since the late 1940's, and has been successfully implemented by Sasol under the trade name "Synthol" in the early 1960's. The Synthol technology is based on circulating fluidized bed (CFB) reactors.

The fixed bed F-T reactors are in operation since the successful startup of the plant in 1956. In 1957 the first mention is made of the use of Sasol feedstocks in LAB production. See "Sasol, 1950–1975", by Johannes Meintjies, Tafelberg, Cape Town, 1975, p 90; 92 (ISBN 0-624-00780-4).

Since the start of the F-T commercial units, research on both the process as well as the products has been undertaken. This led to the commercialisation of two new reactor types for the F-T reaction being the Sasol Advanced Synthol reactor (SAS) and the Slurry Bed F-T Reactor. This resulted in even better process efficiency at lower capital and operating cost.

All the F-T reactors produce a variety of valuable chemicals. One of the major product groups is olefins. Olefins produced include linear alpha olefins, mono-methyl branched alpha olefins, di- and tri-methyl branched alpha olefins and significantly lesser amounts of other branched and/or linear internal olefins. When the products of these reactors are worked up by distillation and/or other separations techniques and hydroformylated or oxydized by any similar technique, new detergent alcohol mixtures are obtained. The preferred method is separation via distillation and hydroformylation.

The same olefins can be produced using shorter chains of olefins $C_3$ to $C_8$ by adding, as a process step, dimerisation or oligomerization. Typically dimerisation of single carbon number fractions or mixtures thereof. Preferably a mixture of $C_7$ to $C_9$ or the single cuts $C_7$ or $C_8$ or $C_9$. Oligomerization will typically be single carbon cuts or mixtures from $C_3$, $C_4$, $C_5$, $C_6$ that is oligomerized to $C_9$ to $C_{24}$.

These novel mixtures are technically advantageous when converted to various surfactants (some of the effects are described in an article called: "Fatty OXO-Alcohols: Relation between the alkyl chain structure and the performance of the derived AE, AS, AES" by A. Zatta et. al., World Surfactants Congress, 4$^{th}$ (1996), Volume 1, 213–226, CESIO), and economically attractive for the manufacturer of detergents. Also refer to WO 9701521 A1 published Jan. 16, 1997 assigned to Sastech, which is based on 95ZA-0005405 of Jun. 29, 1995. These documents are by means of reference incorporated herein in their entirety.

The detergent and cleaning products industries being old and well established, there are numerous publications on the use and incorporation of surface active agents (surfactants) in detergents. Among the many which can be cited are those referenced in Mc Cutcheon's well-known formulary and in Kirk Othmer's Encyclopedia of Chemical Technology, 1st–4th editions, volumes in the hereinbefore-referenced Surfactant Science Series, and large numbers of patents. Collections useful to the formulator further include "Detergent Manufacture Including Zeolite Builders and Other New Materials", Ed. Sittig, Noyes Data Corp., New Jersey, 1979, "Detergents and Textile Washing", G. Jakobi, A. Lohr et al, VCH Publishers, New York, 1987, and "Liquid Detergents", Volume 67 in the Surfactant Science Series, Ed. K-Y. Lai, Marcel Dekker, New York, 1997.

In the recent past, there has been an increasing desire from the manufacturer(s) of detergents to provide more soluble and cool-water effective cleaning compositions. This stems from the fact that in many countries, washing temperatures are on the decline. It is highly desirable to be able to clean fabrics and other articles in cool or cold water because of the energy economy, due to the large number of consumers who do not have access to convenient sources of hot water, and because cool water washing is less damaging and shrinking to fabrics. The greater use of more delicate synthetic fibers also contributed to the cooler washes. As has now been discovered, there is a very good "fit" between the need of the detergent manufacturer and what is now available from Sasol in the form of certain mixtures of methyl branched and some linear detergent alcohols as precursors for surfactant manufacture (especially methyl branched primary alcohols). Specifically, it is predicted from theory and observed behavior that methyl branching will enhance solubility of a surfactant without negatively affecting surfactant performance. A general rule for ionic surfactants is that the critical micelle concentration (cmc) is halved by the addition of one methylene group to a straight chain hydrophobic tail attached to a single hydrophilic group. See the hereinbefore-referenced Vol. 56 in the Surfactant Science Series.

One other desire from a manufacturing point of view is that detergents need to be less toxic and less irritating to the skin. These new detergent alcohols have the further advantages from a toxicity point of view as stated in "Environmental and Human safety of Major surfactants" by S. S. Talmage, pp 59,Chapter 4. This publication is hereby being incorporated in its entirety.

Specific work on the benefits of mono branched alcohols (this work includes methyl branching) versus linear alcohols is already demonstrated in the work of A. Zatta et al previously mentioned.

Accordingly it is an object herein to provide novel detergent surfactants derived from alcohol mixtures from hydroformylated F-T olefins such as those derived from all Sasol's F-T Reactors, and all manner of cleaning and detergent products making use of the advantageous properties of these materials.

SUMMARY OF THE INVENTION

The present invention relates to a detergent or cleaning composition comprising (a) an effective amount, preferably from about 0.1% to about 99.9%, of a detersive surfactant selected from alkyl sulphates (preferably having the formula $ROSO_3M$ wherein M is a charge-balancing cation, preferably sodium or potassium), alkylpoly(alkoxy)sulphates, (preferably having the formula $RO(EO_xPO_y)SO_3M$ wherein x is from 0 to about 30 and y is from 0 to about 30 provided that the sum of x and y is no more than about 30 and M is a charge-balancing cation, preferably sodium or potassium), alkylpoly(alkoxylates) (preferably having the formula $RO(EO_xPO_y)H$ wherein x is from 0 to about 30 and y is from about 1 to about 30 provided that the sum of x and y is no more than about 30), and mixtures thereof, wherein any of said surfactants incorporates at least one mole of the R-O-radical of an $R=C_{9-C15}$ detergent alcohol of formula ROH, wherein R is mixtures of methyl branched and some linear chains, (this can include linear alpha olefins, mono-methyl branched alpha olefins, di- and tri-methyl branched alpha olefins and significantly lesser amounts of other branched and/or linear internal olefins), and said alcohol is further characterized in that it comprises the product of at least one Sasol Fischer-Tropsch process step and at least one Oxo process step; and (b) an effective amount, preferably from about 0.1% to about 99.9%, of one or more adjuncts at least partially contributing to the useful properties of the composition.

The broad description above does not exclude by any means specific descriptions from the invention. A specific typical description could be a detergent or cleaning composition comprising (a) 22% of a detersive surfactant selected from alkyl sulphates (preferably having the formula $ROSO_3M$ wherein M is a charge-balancing cation, preferably sodium), wherein the said surfactant incorporates at least one mole of the R-O- radical of an $R=C_{12}-C_{15}$ detergent alcohol of formula ROH, wherein R is mixtures of methyl branched and some linear chains (this can include linear alpha olefins, mono-methyl branched alpha olefins, di- and tri-methyl branched alpha olefins and significantly lesser amounts of other branched and/or linear internal.), and said alcohol is further characterized in that it comprises the product of at least one Sasol Fischer-Tropsch process step and at least one Oxo process step; and (b) of one or more adjuncts that at least partially contribute to the useful properties of the composition.

This also relates to a detersive surfactant selected from Alkylpoly(alkoxy)sulphates, (preferably having the formula $RO(EO_xPO_y)SO_3M$), alkylpoly(alkoxylates) (preferably having the formula $RO(EO_xPO_y)H$), and mixtures thereof.

In one embodiment, the invention encompasses a detergent or cleaning composition wherein said component, (a), is an alkyl sulphate in acid-, sodium-, potassium-, lithium-, ammonium or substituted ammonium salt form. The ammonium forms include trialkanolammonium forms such as triethanolammonium. All other salt forms having useful properties, such as divalent and/or trivalent metal ion salts are also encompassed. Divalent metal ions are nonlimitingly illustrated by calcium and magnesium, and trivalent metal ions are nonlimitingly illustrated by aluminum.

In another embodiment, the invention encompasses a detergent or cleaning composition wherein said component, (a), is the alkoxylate of said detergent alcohol and wherein this alkoxylate is produced by at least one step selected from ethoxylation, propoxylation, and mixed alkoxylation and wherein said alkoxylate is non-capped or is capped using any suitable capping moiety such as methyl, ethyl, propyl or the like. Either narrow-range or broad-range cuts, in terms of alkoxylate distribution, are encompassed.

In yet another embodiment, the invention encompasses a detergent or cleaning composition wherein said component, (a), is a sulphated alkoxylate produced by at least one step selected from ethoxylation, propoxylation, and mixed alkoxylation and at least one step selected from sulfation using any conventional sulfation reagent and wherein said component, (a), is in acid-, sodium-, potassium-, lithium-, ammonium or substituted ammonium salt form. All other salt forms having useful properties, such as divalent and/or trivalent metal ion salts are also encompassed.

The invention is by no means limited to single surfactants by way of said component, (a). Thus, also encompassed is a detergent or cleaning composition wherein said component, (a), is a mixture of two or more of any of said component (a) derivatives. Of particular note, there is included herein a detergent or cleaning composition wherein said component, (a), is a mixture of any of said recited component (a) derivatives in intimate admixture with fully linear analogs. Also encompassed are compositions wherein component (a) is further combined with any conventional detergent surfactant.

Component (b) in the invention can vary widely and typically, though purely illustrative and not limiting, is selected from the group consisting of inorganic builders, organic builders, water-soluble polymers, chelating agents, bleaches, bleach activators, transition-metal containing bleach catalysts, detersive enzymes, enzyme stabilizers, perfumes, colorants, fluorescent whitening agents, solvents, hydrotropes, conventional surfactants, abrasives, soaps, fatty acids, general-purpose stabilizers, processing aids, aesthetic speckles, clays, softening agents, silicones, antistat agents, suds suppressors and mixtures thereof, all as well-known materials disclosed in the detergent arts.

The invention can take any convenient form. Preferred forms include a detergent or cleaning composition wherein said detergent has the form of a heavy-duty granular detergent, heavy-duty liquid detergent, light-duty granular detergent, light-duty liquid detergent, hard-surface cleaner, abrasive cleaner, soap or syndet bar, automobile washing agent, floor cleaner, shampoo, dishwashing detergent, wetting agent, or the like.

Inorganic builder, when present, is suitably a phosphate salt, although where regulation does not permit this, the builder may be phosphate-free; thus builders herein can include silicates and aluminosilicates. Certain preferred builders are selected from aluminosilicates, which can be amorphous or crystalline. Preferred builders include zeolites A, P and maximum aluminum P. Such builders can be sized to improve surfactant adsorption or suitably can have mean particle size in the range from about 0.01 micron to about 10 micron. Zeolite P, including the maximum aluminum form, can be especially preferred. Bleach, when present, can include either chlorine types or oxygen types, the latter preferably selected from sodium perborate monohydrate, sodium perborate tetrahydrate, sodium percarbonate and mixtures thereof.

A typical detergent or cleaning composition can have from about 1% to about 30% of component (a) while component (b) comprises from about 0.1% to about 80% of a builder; from 0% to about 30% of a conventional surfactant, from about 0. 1% to about 30% of a bleach or bleach/bleach adjunct mixture; from about 0.0001% to about 5% of detersive enzyme selected from the group consisting of proteases, amylases, lipases, cellulases, pullulanases, keratinases, or the like and mixtures thereof, and from about 0.1% to about 10% of a water-soluble polymer.

The invention has numerous advantages. Without intending to be limited by theory, it is believed that advantages such as solubility, rapid efficacy in cool water, hardness tolerance and the like are all improved by the subtle but important light branching especially characteristic of the process used to make the Sasol detergent alcohol precursor for the instant surfactants and detergent compositions.

DETAILED DESCRIPTION OF THE INVENTION

Detergent Alcohols

Detergent compositions of the present invention are based on specific detergent alcohols which are all primary alcohols produced by hydroformylation, workup and oxo operations. See WO 9701521 A1 incorporated by reference in its entirety. The preferred alcohols are mixtures, especially with respect to methyl substitution. While a conventional F-T process provides little opportunity to change the quantities of different isomers in each carbon number range, the present invention makes it possible to have significant variation in ratio by flexibility in workup steps. In preferred embodiments, there are included herein a $C_{12}$–$C_{13}$ detergent alcohol and a $C_{14}$–$C_{15}$ alcohol, though Sasol's full range $C_{12}$–$C_{15}$ and $C_9$–$C_{11}$ (or shorter) cuts or individual carbon number cuts are not intended to be excluded from the preferred commercial materials. A typical $C_{11}$ cut, defined as olefin, is illustrated by the non limiting example of a mixture of about 55% 1-undecene and about 45% of a mixture of 2-methyl-1-decene, 3-methyl-1-decene, 4-methyl-1-decene, 5-methyl-1-decene, 6-methyl-1-decene, 7-methyl-1-decene, 8-methyl-1-decene, and 9-methyl-1-decene. This is a typical breakdown of olefins in a single carbon number cut obtained from the Sasol process. Depending on the precise details of the hydroformylation technology, specific detergent alcohols are produced. With a non-isomerizing hydroformylation catalyst, the alcohols corresponding to the above-illustrated $C_{11}$ olefin cut will include n-dodecanol and 2-methyl-1-undecanol deriving from 1-undecene and 4-methyl-1-undecanol and 2,3-dimethyl-1-decanol deriving from 3-methyl-1-decene; along with all the other isomers consistent with the remainder of the alkenes in the $C_{11}$ cut. With an isomerizing hydroformylation catalyst, various primary alcohols are formed by reaction with internal olefins. These isomers may constitute from about 5% to about 10% by weight of the total alcohol.

Olefin feeds used to produce alcohols herein also may optionally contain some cyclic olefins.

Detergent alcohols herein are available from Sasol under the designations depicted in the following table:

| Alcohol | Designation |
|---|---|
| $C_{12}$–$C_{13}$ Sasol Detergent Alcohol | Sasol Detergent Alcohol $C_{12}$–$C_{13}$ |
| $C_{14}$–$C_{15}$ Sasol Detergent Alcohol | Sasol Detergent Alcohol $C_{14}$–$C_{15}$ |
| $C_{12}$–$C_{15}$ Sasol Detergent Alcohol | Sasol Detergent Alcohol $C_{12}$–$C_{15}$ |

The detergent alcohols herein have a number of useful properties, for example excellent color and low bromine index. A typical $C_{12}$–$C_{13}$ alcohol (produced with an hydroformylation catalyst that effect isomerization as well) comprises 1% less than $C_{12}$, 45–55% $C_{12}$, 35–50% $C_{13}$ and up to 10%>$C_{13}$. Such compositions can have unusually low pour points, e.g. even as low as 0 deg. C.

Detergent Alcohol Conversion to Derivative surfactants

The detergent alcohol starting-materials herein are converted to useful surfactants such as the alkyl sulphates, poly(alkoxy)sulphates or the corresponding nonionic addition products of ethylene oxide, propylene oxide, or mixtures thereof using any of the well-known methods of the art. See, for example, the common sulfation and/or ethoxylation methods including those referenced in "Detergent Manufacture Including Zeolite Builders and Other New Materials", Ed. Sittig, Noyes Data Corp., New Jersey, 1979 or alkoxylation as taught in Schönfeldt supra.

Applications and Formulation Types

Essentially linear or any other known analogs of the surfactants and wetting agents herein, including the alcohol sulphates and alcohol ether sulphates (including those sometimes known as alcohol polyethoxy sulphates or alkylpoly (alkoxy)sulphates), which are readily accessible from detergent alcohols, have already been widely used in consumer product cleaning formulations and industrial cleaners. See, for example, the hereinabove-referenced Surfactant Science Series Vol. 56, at pages 276–278. According to the present invention, improved formulation results can be secured by using any of the new $C_{12}$–$C_{15}$ mixtures of methyl branched and some linear derivatives to be produced and made available by Sasol. Specific applications include shampoos, toothpastes, synthetic soaps and hand cleaners, liquid soaps, emulsifiers for cosmetic creams, household formulations such as light-duty liquids, manual dishwashing detergents and liquid household cleaners; as well as heavy-duty detergents. More specialized uses include carpet cleaners and foam bath compositions. In the agrochemical industry, alkyl sulphates are used as dispersing and wetting agents in the formulation of pesticides as wettable powders. In the textile and leather industry they are used as detergents in many processes such as wool scouring. In the industry of latex and plastics they are used as polymerization emulsifiers, as stabilizers for latex dispersions, and as foamers for latex and phenol resin foams. In the paint industry they are used as antisettling agents. In the construction industry they are used as wetting and foaming agents in the preparation of cement mortar slurries. In the mining industry they are used as frothers and collectors for several ores. Other uses include in medicinal preparations. Nonionic polyethoxylated alcohols likewise are widely useful in detergents including recently developed compact granules comprising high levels of nonionic surfactant adsorbed onto zeolites; as well as in low-foam heavy-duty and light-duty liquid detergent types. The sulphated versions of the alcohol alkoxylates are useful for limesoap dispersion, for co-formulation with a variety of surfactants in liquid detergents, and can also be useful in heavy-duty granules. Applications of surfactants derived from Sasol detergent alcohols further include industrial and institutional cleaning products, enhanced oil recovery, mineral recovery and other fields such as foam-blowing and plastics production in which surface-active agents are known to be useful.

The above does not intend by any means to exclude the $C_9$–$C_{11}$ range used in both surfactants and wetting agent fomulations.

The following are merely illustrative of the many applications of surfactants, especially alkyl sulphates, which are derivable from detergent alcohols. It is contemplated to reapply surfactants derived from Sasol detergent alcohols in any of these applications. Typically such application is possible by the simple step of substituting the conventional or disclosed surfactant by a $C_{11}$–$C_{15}$ or lighter, material incorporating a moiety RO-derived from a Sasol detergent alcohol. With reference to the benefits asserted to be associated with the patented systems described below, any such benefits are those identified by the patentee or applicant and are not necessarily independently confirmed (as applied to the original invention systems) by the developers of the present invention.

Heavy duty granular laundry detergents

U.S. Pat. No. 5,565,420 of Oct. 15, 1996 describes granular laundry detergents having improved cold water solubility, comprising linear alkylbenzene sulphonate surfactant, alkyl sulphate surfactant, alkyl ethoxylated sulphate surfactant, polyethylene glycol, polyacrylate and other components; JP08143894 A of Jun. 4, 1996 describes a bleaching detergent having high storage stability and solubility comprising coated sodium percarbonate, organic peracid precursors and alkyl sulphate(s) and optionally aluminosilicate(s) and alkali metal silicates; GB2296919 A of Jul. 17, 1996 describes granular or liquid laundry detergents containing alkyl sulphate surfactant, nonionic surfactant and zeolite P builder with surfactants derived from renewable natural sources; JP08092593 A of Apr. 9, 1996 describes bleaching detergent compositions comprising coated sodium percarbonate, organic peracid precursors and alkyl sulphates, having high storage stability and solubility; JP08073888 A of Mar. 19, 1996 describes high bulk density granular detergents made without hydrolysis of alpha-sulpho fatty acid ester salts by spray-drying detergent slurry mixtures of (bi)carbonate(s), alpha-sulpho fatty acid ester(s) and e.g. alkyl sulphate(s) then granulating; DE4415369 C1 of Aug. 31, 1995 describes heterogeneous surfactant granulates useful in washing powder and detergent having a core of alkyl sulphate and optionally alkyl ether sulphate coated with alkyl sulphate having shorter chain, assertedly to increase cold water solubility rate; DE4335955 A1 of Apr. 27, 1995 describes preparation of mechanically stable high density washing or cleaning-active extrudates comprising extruding solid pre-mixtures containing granulated alkyl sulphate(s) and chopping extrudate to desired granular dimensions; WO9505447 A1 of Feb. 23, 1995 describes granular detergents assertedly giving improved cleaning performance especially on greasy and oily stains comprising secondary di alkyl sulphate surfactant, enzyme, peroxygen bleaching agent and a bleach activator e.g. alkyl oxybenzene sulphonate; WO9502390 A1 of Jan. 26, 1995 describes surfactant systems containing alkyl sulphate derived from natural sources comprising a mixture of alkyl chain lengths, assertedly providing good detergency; WO9500625 A1 of Jan. 5, 1995 describes granular laundry detergent compositions comprising lipase, alkylalkoxy sulphate or polyhydroxy fatty acid amide, and sodium nonanoyloxybenzene sulphonate (NOBS) and sodium perborate; WO9424244 A1 of Oct. 27, 1994 describes high density granular detergent compositions comprising secondary alkyl sulphate surfactant which is said to enhance removal of dirt from fabrics; WO9424243 A1 of Oct. 27, 1994 describes free flowing granular detergent compositions coated with secondary alkyl sulphate surfactants which are described as environmentally friendly, assertedly giving improved soil removal during fabric washing; WO9424242 A1 of Oct. 27, 1994 describes free flowing detergent particles containing secondary alkyl sulphate surfactants which are said to be environmentally friendly and to show increased compatibility with detergent enzymes and to have greatly improved cold water solubility; WO9424241 A1 of Oct. 27, 1994 describes detergent compositions in stable liquid, gel, bar or granular form containing secondary alkyl-sulphate and magnesium ions for assertedly better suds and cleaning, being said to be milder to the skin and more environmentally friendly; WO9424240 A1 of Oct. 27, 1994 describes stable enzyme containing detergent compositions in which presence of secondary alkyl sulphate surfactant assertedly enhances enzyme stability supposedly giving better cleaning, being good for skin and more environmentally friendly; DE4203031 A1 of Aug. 5, 1993 describes production of solid detergents with high bulk density using alkyl sulphate or olefin or alkyl-aromatic sulphonate additives, assertedly to improve dissolution; SU1707058 A1 of Jan. 23, 1992 describes powdered cleaning agents made from secondary alkyl sulphate, alkyl sulphonate, calcite, sodium carbonate, bioactive aloe extract, bioactive wormwood extract, fragrance and zeolite; WO9302168 A1 of Feb. 4, 1993 describes granular detergent compositions prepared by spray drying slurry containing alkyl sulphate, anionic surfactant, detergency builder and silicate then mixing with specified alkyl sulphate particles; JP04213399 A of Aug. 4, 1992 describes high bulk density granular detergent with improved solubility containing one sulphate of fatty acid lower alkyl ester, one of lower alkyl sulphonate(s) and one of alkyl sulphate and alkyl ether sulphate mixture; RD-315020 A of Jul. 10, 1990 describes granular high bulk density detergents or components containing primary alkyl sulphate anionic detergent active material and sodium aluminosilicate; JP02169696 of Jun. 29, 1990 describes a high-density granular concentrated detergent comprising inorganic builders and anionic surfactant, e.g. alkyl benzene sulphonate(s), alkyl sulphate(s) and alkane sulphonate(s); JP02103297 of Apr. 16, 1990 describes a high-bulk-density granular detergent containing ester sulphonate(s) of fatty acid, alpha-olefin potassium sulphonate, lower alkyl sulphate and aluminosilicate; EP 301412 A of Feb. 1, 1989 describes pourable, free-flowing antifoaming additives containing foam-inihibiting silicone and salts on cellulose-based substrate, and high-foaming anionic surfactant, e.g. alkyl sulphate; EP 220024 A of Apr. 29, 1987 describes granular detergents containing alkylbenzene sulphonate and alkyl sulphate surfactants, alkali metal silicate, also sulphate and phosphate; EP 219314 A of Apr. 22, 1987 describes granular detergent compositions with good solubility containing alkylbenzene sulphonate and alkyl sulphate surfactant mixtures, alkali metal silicate and sulphate; DE3420334 A of Dec. 6, 1984 describes cleaning agents containing alpha-sulpho fatty acid ester salt, alkyl sulphate and polyethylene glycol; DE2204865 A describes detergent powder compositions containing soluble laurate salts as builders and alkyl sulphates or sulphonates.

It is contemplated that alkyl sulphates, alkyl alkoxylates (such as the ethoxylates, propoxylates, and mixed alkoxylates), as well as the alkyl ethoxysulphates derivable from the present Sasol detergent alcohols, can be used in all such applications, in particular, alkyl sulphates derived from the Sasol alcohols can be a suitable or superior substitute for either primary alkyl sulphates, secondary alkyl sulphates and the like in heavy duty granular detergent applications. Moreover, surfactants derived from the instant mixtures of methyl branched and some linear detergent alcohols remain biodegradable.

Heavy duty liquid detergents

WO9712022 A1 of Apr. 3, 1997 describes heavy duty liquid laundry detergent compositions containing alkyl sulphate or alkyl polyethoxylate sulphate anionic surfactant, quaternary ammonium surfactant and amine oxide surfactant; WO9712020 A1 of Apr. 3, 1997 describes liquid laundry detergent compositions free of linear alkyl benzene sulphonate surfactants with a surfactant system comprising alkyl sulphate or alkyl alkoxy sulphate anionic surfactants and a quaternary ammonium surfactant; RO 95108 A of Aug. 30, 1988 describes a low temperature liquid detergent for washing natural and synthetic fabrics containing anionic ethoxylated-alkyl-sulphate, soap, and cellulose ester(s); WO9612000 A1 of Apr. 25, 1996 describes liquid detergent compositions for fabric pretreatment for improved packing comprising anionic surfactant e.g. alkyl alkoxy sulphate and primary and/or tertiary- amine and poly hydroxy fatty acid amide and/or amine oxide; JP06033090 A of Feb. 8, 1994 describes liquid detergent for clothes, assertedly having high detergency and biodegradability containing an alkyl sulphate having 8–10 carbon alkyl group or oleyl sulphate; US5281366 A of Jan. 25, 1994 describes production of surfactant compositions containing secondary alkyl sulphate using base dispersed in nonionic surfactant to neutralise sulphation product, and thin-film evaporators to neutralise sulphation product and to remove unreacted organic matter; WO9324452 A1 of Dec. 9, 1993 describes preparation of solid surfactant compositions containing secondary alkyl sulphate, made by sulfating olefin or alcohol, neutralising, saponifying and crystallising by cooling in presence of diluent, for making powdered or liquid detergents; WO9712027 A1 of Apr. 3, 1997 describes stable heavy duty liquid detergent compositions containing alkyl sulphate or alkyl polyethoxylated sulphate and amine oxide surfactant, said to be able to hold particles in suspension; WO9700929 A1 of Jan. 9, 1997 describes liquid detergent compositions for pretreating fabrics comprising anionic surfactants comprising alkyl-(alkoxy) sulphate(s) and tertiary amine; WO9637591 A1 of Nov. 28, 1996 describes liquid personal cleansing mild compositions assertedly for improved skin and hair feel comprising short chain alkyl sulphate and alkyl ethoxy sulphate surfactants, auxiliary surfactant, cationic conditioning polymer and water; GB2298211 A of Aug. 28, 1996 describes assertedly cost-effective heavy duty liquid laundry detergents containing anionic alkyl sulphate(s) and alkyl poly ethoxylate sulphate(s), nonionic fatty alcohol ethoxylate(s) and protease in water-based carrier; GB2296919 A of Jul. 17, 1996 describes granular or liquid laundry detergent compositions containing alkyl sulphate surfactant, nonionic surfactant and zeolite P builder with surfactants derived from renewable natural sources; WO9614378 A1 *of May* 17, 1996 describes light duty liquid cleaning compositions comprising water soluble nonionic-, ethoxylated alkyl ether sulphate anionic-, paraffin sodium sulphonate-, alkyl sulphate-and betaine surfactants; WO9533030 A1 of Dec. 7, 1995 describes liquid laundry detergent compositions containing oleoyl sarcosinate and alkyl alkoxylated sulphate and/or alkyl sulphate as anionic surfactant, assertedly having good detergency and skin mildness; US 1478 H of Sep. 5, 1995 describes liquid laundry detergent compositions containing secondary alkyl sulphate; EP 656416 A1 of Jun. 7, 1995 describes use of alkanolammonium alkyl sulphate or alkyl ether sulphate concentrates as base surfactants for concentrated liquid formulations; WO9424245 A1 of Oct. 27, 1994 describes purification of secondary alkyl sulphate surfactants, used in manufacture of liquid or gel detergent compositions for fabric cleaning by contacting with wash water of temperature greater than the Krafft temperature of the surfactant; WO9424241 A1 *of Oct.* 27, 1994 describes detergent compositions in stable liquid, gel, bar or granular form, containing secondary alkyl-sulphate and magnesium ions for better suds and cleaning, assertedly milder to the skin and more environmentally friendly; WO9424240 A1 of Oct. 27, 1994 describes stable enzyme containing detergent compositions: apparently, presence of secondary alkyl sulphate surfactant enhances enzyme stability; WO9424239 A1 of Oct. 27, 1994 describes calcium containing detergent compositions in stable liquid, gel or other forms where the presence of secondary alkyl sulphate is said to enhance the removal of greasy stains and soils from fabrics, making them milder to the skin and more environmentally friendly; JP06240292 A of Aug. 30, 1994 describes high-concentration neutral liquid detergent compositions, said to retaining relatively high viscosity containing anionic surfactant of alkyl sulphate(s), sulphonate(s) etc., solvents e.g. ethanol and propylene glycol, acid and water; JP06200290 A of Jul. 19, 1994 describes liquid detergent compositions with asserted mildness to skin and hair and high foaming power containing organic phosphates and water soluble anionic surfactant e.g. alkyl sulphate, polyoxyethylene alkyl ether sulphate etc.; EP-609574 A1 of Aug. 10, 1994 describes highly concentrated alkyl sulphate solutions used in liquid detergent compositions which are characterised as isotropic and free flowing at room temperature and do not require additional cosolvents. WO9416042 A1 of Jul. 21, 1994 describes detergent compositions comprising alkyl sulphate(s), alkyl betaine(s) and alkyl poly glycoside(s). WO9413632 A1 of Jun. 23, 1994 describes a surfactant composition preparation for household use made by sulphating olefin and/or secondary alcohol optionally containing primary alcohol, neutralising, heating to saponify dialkyl sulphate and remove water, cooling and recovering crystallised solid; DE4232166 A1 of Mar. 31, 1994 describes aqueous free flowing and pumpable alkyl sulphate pastes with defined low flow limit and viscosity, their preparation and use in preparation of washing and cleaning compositions; WO9404644 A1 of Mar. 3 1994 describes aqueous liquid cleaning compositions comprising primary alkyl sulphate surfactants in the form of magnesium salts and nonionic surfactants, assertedely providing excellent fatty soil detergency at neutral pH; EP-520551 A2 of Dec. 30, 1992 describes pearlescent liquid detergent compositions comprising organic pearlescer, primary alkyl sulphate anionic surfactant, and pearlescer crystallisation enhancer e.g. alkylbenzene sulphonate or soap; EP-504986 A2 of Sep. 23, 1992 describes liquid aqueous concentrated alkyl sulphate compositions containing alcohol ethoxylate, alcohol ethoxy sulphate or optionally sulphated poly alkylene glycol as viscosity regulator; WO9206162 A of Apr. 16, 1992 describes alkyl sulphate based, controlled sudsing liquid or solid detergent comprising specified amounts of poly hydroxy fatty acid amide, alkyl sulphate surfactant and a suds suppressor; DE4025065 A of Feb. 13 1992 describes aqueous pourable pumpable surfactant mixtures containing alkyl-glycoside, long- and short-chain alkyl sulphate(s), with lower viscosity, used in liquid washing and cleaning compositions; DE4023893 A of Jan. 30, 1992 describes aqueous liquid bleaching washing compositions with low biodegradability containing alkyl sulphate, oleic acid soap, saturated higher fatty acid soap, alkyl glucoside, alcohol ethoxylate, hydrogen peroxide and other components; DE4023334 A of Jan. 30, 1992 describes pumpable compositions containing alkyl glycoside, ethoxylated amide, and optionally, alkyl sulphate, for production of liquid washing and cleaning composition; DE4019790 A of Jan. 2, 1992 describes liquid aqueous surfactant concentrates containing alkyl glycoside, sulphonated fatty acid salt and alkyl sulphate; WO9116409 A of Oct. 31, 1991 describes storage stable aqueous liquid detergent compositions containing primary alkyl sulphate present in non-solid dispersed phase; DE3838808 A of May 23, 1990 describes surfactant mixtures for washing and cleaning agents comprising alkyl glycoside mixtures and anionic fatty alkyl sulphate, alpha sulpho ester, secondary sulpho-hydroxy ester; EP-328184 A of Aug. 16, 1989 describes liquid detergent compositions comprising an alkyl sulphate and/or ethoxylated sulphate surfactant and water-insoluble, amine-organic anion ion-pair conditioning particles; SU1416508 A of Aug. 15, 1988 describes manufacture of a synthetic washing medium by mixing magnesium sulphate, sodium alkyl sulphate(s), and/or alkylbenzene-sulphonate(s) and alkyl phosphate(s) adding waterglass etc; RO 95108 A of Aug. 30, 1988 describes low temperature liquid detergents for washing natural and synthetic fabrics containing ânionic ethoxylated alkyl sulphate, soap, and cellulose ester(s); EP 300444 A of Jan. 25, 1989 describes assertedly new alkyl sulphate ether sulphate mixtures containing propylene oxy groups for use in surfactant compositions and the preparation of liquid, aqueous washing and cleaning compositions; DE3619358 A of Dec. 10, 1987 describes liquid sodium alkyl sulphate compositions containing nonionic surfactant, polyol and water; GB2181152 A of Apr. 15, 1987 describes liquid detergent compositions containing ethoxylated alkyl sulphate surfactant with sulphated adduct of poly alkylene oxide and polyol to prevent film formation and gelation on exposure to air; JP60130697 A of Jul. 12, 1985 describes liquid detergent compositions comprising polyoxyethylene alkyl sulphate, higher fatty acid and alkanolamine; JP60011596 A of Jan. 21, 1985 describes liquid detergent compositions comprising alpha-sulpho-aliphatic di carboxylate di salt and alkyl sulphate ester; SU-973604 A of Nov. 15, 1982 describes liquid domestic detergent compositions containing sodium alkyl- sulphate and sulphonate, potassium oleate, tri poly-phosphate sodium chloride, sodium carbonate, optical brightener etc.; EP 87,914 A of Sep. 7, 1983 describes detergent compositions for washing textiles containing alkyl sulphate, cationic surfactant, sulphonate surfactant and optionally, nonionic surfactant; SU-891651 B of May 31, 1981 describes preparation of sulpho-ethoxylate and alkyl-sulphate compounds from alcohol in up-flowing sectioned columns using liquid sulphation mixtures of sulphur di- and tri oxide sprayed in to more than one section and use in detergents; SU 740754 B of Jun. 15, 1980 describes triethanolamine salt of alkyl-sulphate preparation by sulphonating primary higher fatty alcohol fraction and treating product with tri ethanolamine, to give surfactant; JP55056196 A of Apr. 24, 1980 describes liquid detergent compositions containing olefin sulphonate with polyethylene alkyl sulphate having added ethylene oxide, and tert. amine oxide; BE-860893 A of May 17, 1978 describes high viscosity detergent compositions with assertedly low clearing point comprising low crystalline fraction, secondary alkyl sulphate and an alpha-olefin sulphate; DE2501622 A of Jul. 24, 1975 describes aqueous solutions of surfactant alkyl sulphates prepared in gel-free form by neutralising acid alkyl sulphates within concentrated liquid state; DE2132300 A describes detergent components and compounds of alkyl alkoxy sulphate type with 10–16 carbon alkyl groups predominating; EP 573341 A2 of Dec. 8, 1993 describes mild, high foaming, nonionic surfactant based liquid detergent compositions comprising nonionic surfactant e.g. alkanol condensates, anionic detergent e.g. alkyl sulphate(s) and a betaine; EP-573329 A2 of Dec. 8, 1993 describes mild, high foaming, nonionic surfactant based liquid detergent compositions comprising water-soluble nonionic surfactant, water-soluble anionic detergent, water-soluble betaine, alkyl mono ethanol amide, alkyl di ethanol amide and water; US5254291 A of Oct. 19, 1993 describes foaming surfactant compositions comprising ethoxylated fatty alcohol, fatty acid alkanol amide, and alkyl sulphate; US5238609 A of Aug. 24, 1993 describes surfactant compositions containing amine oxide and alkyl sulphate, and further comprising normally liquid poly alkylene glycol, providing good foamability economically; and EP-554991 A1 of Aug. 11, 1993 describes stable liquid or gel detergent compositions comprising specific primary alkyl sulphate(s), with betaine and/or amine oxide. Alkyl sulphates, alkyl alkoxylates and ethoxysulphates derivable from the instant detergent alcohols are expected to be suitable for use in all such preceding liquid detergent compositions. These may include high-foaming as well as low-foaming types, types for use in appliances, and types for handwashing of fabrics.

Light-Duty Liquid/Dishwashing Detergents

While the foregoing disclosure relates primarily to granular and liquid detergents for fabric washing, the detergent alcohols herein may also, in their various surfactant derivative forms be incorporated into liquid dishwashing detergents. These are illustrated by: US5607910 A of Mar. 4, 1997 which describes detergent gels in hexagonal liquid crystal phase, containing no hydrotrope used as dish-care gel, comprising ethoxylated alkyl sulphate surfactant, secondary sulphonate surfactant, other surfactants, water and magnesium ions; WO9637590 A1 of Nov. 28, 1996 which describes a general purpose cleansing agent or washing up liquid containing primary and secondary alkyl sulphate compounds for improved grease removing properties even at low temperatures; WO9635770 A1 of Nov. 14, 1996 describing light duty cleaning composition of use as dish-wash comprising alkyl sulphate, alkyl ether sulphate and alkyl poly glucoside surfactants with a betaine or amine oxide; US 1559 H of Jul. 2, 1996 which describes light duty liquid detergent compositions which are said to be biodegradable containing one or more secondary alkyl sulphate surfactant components, apparently associated with good detergency properties and dissolution rates; WO9614378 A1 of May 17, 1996 which describes a light duty liquid cleaning composition comprising water soluble nonionic-, ethoxylated alkyl ether sulphate anionic-, paraffin sodium sulphonate-, alkyl sulphate-and betaine surfactants; GB2290301 A of Dec. 20, 1995 describing a washing up liquid composition with good cleaning and lathering properties, containing amine oxide and a larger amount of alkyl sulphate as detergent active materials; EP 656416 A1 of Jun. 7, 1995 describing use of alkanol-ammonium alkyl sulphate or alkyl ether sulphate concentrates as base surfactant for concentrated liquid formulations; GB2280450 A of Feb. 1, 1995 describing detergent gel compositions comprising ethoxylated alkyl sulphate(s), secondary sulphonate (s), water, and magnesium ions; WO9424241 A1 of Oct. 27, 1994 describing detergent compositions in stable liquid, gel, bar or granular form containing secondary alkyl-sulphate and magnesium ions for better suds and cleaning, assertedly milder to the skin and more environmentally friendly; WO9416042 A1 of Jul. 21, 1994 describing detergent compositions comprising alkyl sulphate(s), alkyl betaine(s) and alkyl poly glycoside(s); WO9414947 A1 of Jul. 7, 1994 describing a detergent gel of hexagonal liquid crystals for dish washing comprising water and a surfactant system of ethoxylated alkyl sulphate and amine oxide and/or betaine; GB2272449 A of May 18, 1994 describing detergent gels for dish-care use contain ethoxylated alkyl sulphate surfactants in hexagonal liquid crystal form; RD 338023 A of Jun. 10, 1992 describes liquid dishwashing compositions without alkylbenzene sulphonate based on sodium alkyl sulphate compound, alkyl-ether sulphate and ethoxylated fatty alcohol compound, and amine oxide or betaine compound and RD-338023 A of Jun. 10, 1992 describing liquid dishwashing compositions without alkylbenzene sulphonate based on sodium alkyl sulphate compounds, alkyl-ether sulphate and ethoxylated fatty alcohol compounds, and amine oxide or betaine compounds. Also DE4003098 A of Aug. 8, 1991 describes aqueous liquid cleaning compositions containing alkyl sulphate, alkyl ether sulphate, betaine and alkyl glucoside in defined proportions, for manual washing of dishes; SU1578182 A of Jul. 15, 1990 describes a composition of dishwashing liquid that contains alkyl-sulphonate(s), triethanolamine salts of alkyl sulphate(s), oxyethylated mono ethanolamide(s) etc; EP-300444 A of Jan. 25, 1989 describes assertedly new alkyl sulphate ether sulphate mixtures containing propylene oxy groups for use in surfactant compositions and the preparation of liquid, aqueous washing and cleaning compositions; EP-181212 A of May 14, 1986 describes stable liquid dishwashing detergent containing alkyl benzene sulphonate, alkyl sulphate, alkyl ethoxy sulphate, ethoxylated alcohol and betaine; EP-125854 A of Nov. 21, 1984 describes stable liquid dishwashing compositions containing alkyl benzene sulphonate and/or alkyl sulphate, alkyl ethoxy sulphate, and ethoxylated alcohol; EP-107946 A of May 9, 1984 describes a liquid dishwashing detergent composition containing sulphonate, alkyl ether sulphate, alkyl sulphate and ethoxylated alcohol surfactants; EP 62,371 A of Oct. 13, 1982 describes liquid dishwashing compositions containing alkane sulphonate, ethoxylated alkyl sulphate and magnesium ions; EP 39,110 A of Nov. 4, 1981 describes stable, magnesium containing liquid dishwashing detergent containing alkyl sulphate salt, its ethoxylate, and alkyl benzene sulphonate; DE2904945 A of Aug. 16, 1979 describes detergent and especially dishwashing compositions containing specifically active secondary alkyl sulphate isomers and optionally co-surfactant; GB1518807 A of Jul. 26, 1978 describes mild liquid detergent compositions having excellent sudsing properties containing sulphated alkyl ether, primary alkyl sulphate and alkaline earth metal salt; US4064076 A of Dec. 20, 1977 describes a light duty liquid detergent composition consisting of alpha-olefin sulphonate, ethoxylated alkyl sulphate, amine oxide and sodium allyl sulphonate; BE-848065 A of May 5, 1977 describes nonstreaking, dish-washing compositions which contain 8–24 C secondary alkyl sulphate or sulphonate, alkyl ether sulphate or nonionic surfactant, and casein; BE-844083 A of Jan. 14, 1977 describes dish washing agents containing a low crystalline fraction, secondary alkyl sulphates of olefins; DE2132300 A describes detergent components and compounds of alkyl alkoxy sulphate type with 10–16 carbon alkyl groups predominating; EP-554991 A1 of Aug. 11, 1993 describes stable liquid or gel detergent compositions comprising specific primary alkyl sulphate(s), with betaine and/or amine oxide.

Detergent or soap bars

Detergent alcohols herein after conversion to the alkyl sulphates or alkyl ethoxysulphates or other suitable surfactant derivatives may also be useful in detergent or soap bars for personal cleansing or laundering. Thus, WO9424241 A1 of Oct. 27, 1994 describes a detergent composition in stable liquid, gel, bar or granular form containing secondary alkylsulphate and magnesium ions for better suds and cleaning; GB2272907 A of Jun. 1, 1994 describes a personal cleansing bar with improved lather comprising surfactant and the magnesium salt of alkyl sulphate; WO9216610 A1 of Oct. 1, 1992 describes mild personal cleansing bars comprising specified long chain alkyl sulphate, high lathering, mild synthetic surfactant, soap, fatty acids and paraffin wax having a high melting-point; WO9213060 A2 of Aug. 6, 1992 describes a mild personal cleansing bar with good processability and good in-use properties, comprising a saturated long chain alkyl sulphate and a selected three-component plasticiser binder system; DE4102745 A of Aug. 6, 1992 describes preparation of surfactant powder mixtures by spray drying free flowing aqueous mixture containing alkyl sulphate, alkyl-glycoside and inorganic carrier; DE4038476 A of Jun. 4, 1992 describes preparation of solid washing compositions by mixing aqueous alkyl sulphate paste with sodium sulphate and/or aluminosilicate and shaping or grinding; WO9207931 A1 of May 14, 1994 describes synthetic detergent bars containing higher alkyl sulphate and binder; US5089174 A of Feb. 18, 1992 describes laundry detergent bars comprising mixed alkylbenzene sulphonate alkyl sulphate surfactant, builder, and free fatty alcohol; WO9116412 A of Oct. 31, 1991 describes a soap synbar with improved mildness, bar character and processability comprising saturated long chain alkyl-sulphate having alkyl chains of 16 and 18 carbon atoms; IT1206512 B of Apr. 27, 1989 describes synthetic soaps production from alkyl sulphate(s); GB2145109 A of Mar. 20, 1985 describes sodium higher fatty alkyl sulphate detergent laundry bars resistant to breakage and with good foaming properties; GB2106929 A of Apr. 20, 1983 describes solid detergent material comprising salt of an alkyl sulphate, ethanolamide of fatty acid, magnesium sulphate and inorganic material, especially calcium carbonate; US4058487 A of Nov. 15, 1977 describes non-mushing synthetic detergent toilet bars containing alkane-sulphonate, fatty acid and alkyl-sulphate salt; and BE-758323 A describes a high foaming toilet soap based on tallow soap and alkyl sulphates.

In like manner, surfactants derived from the present detergent alcohols may be introduced into many other known detergent and cleaning formulations. Moreover, any of the additives and adjuncts identified in any of the above-identified patents may be combined singly or severally with any of the surfactants derived from the detergent alcohols identified herein as resulting from the Sasol manufacturing process.

Other Formulations

WO9637591 A1 of Nov. 28, 1996 describes liquid personal cleansing mild composition for improved skin and hair feel comprising short chain alkyl sulphate and alkyl ethoxy sulphate surfactants, auxiliary surfactant, cationic conditioning polymer and water; WO9637589 A1 of Nov. 28, 1996 describes liquid personal cleaning compositions apparently having good skin feel comprising short chain alkyl sulphate surfactant, nonionic poly-hydroxy fatty acid amide surfactant, auxiliary surfactant and water; WO9637588 A1 of Nov. 28, 1996 describes liquid personal cleansing compositions said to have good skin feel comprising short chain alkyl sulphate surfactant, water soluble auxiliary surfactant, cationic polymeric skin conditioner and water; WO9634933 A1 of Nov. 7, 1996 describes an aqueous glass cleaner composition said to have good surface lubricity and filming/streaking characteristics, comprising linear alkyl sulphate detergent surfactant, hydrophobic solvent and aqueous solvent; JP08053695A of Feb. 27, 1996 describes stable, high foaming bleaching detergent compositions containing alkyl sulphonate or alkyl sulphate, diphenyl ether derivatives, alkali, amine oxide and hypochlorite, e.g. for cleaning baths or toilets; DE4131715 A1 of Mar. 25, 1993 describes neutral testing aqueous liquid concentrates used in tooth-paste containing alkyl sulphate, alkali salts of long-chain saturated branched fatty acid and water; US 5164117 A of Nov. 17, 1992 describes surfactant mixtures with low cost and high performance for e.g. shampoo etc. comprising an amine oxide, a fatty acid alkanol amide and an alkyl sulphate surfactant; WO9114759 A of Oct. 3, 1991 describes liquid personal cleansing compositions packaged in squeeze foamer container, comprising surfactant e.g. alkyl-sulphate, water and viscosity enhancing polymer; SU1616988 A of Dec. 30, 1990 describes a detergent composition for degreasing metallic surfaces containing sodium pyrophosphate, tri poly-phosphate and alkyl sulphate(s) of fatty alcohols, nonionic surfactant and potassium soap; DE3527910 A of Feb. 12, 1987 describes liquid hypochlorite bleach compositions containing alkyl ether sulphate and alkyl sulphate surfactants; SU100129 A of Jun. 30, 1984 describes anti-adhesion compositions for granular and sheet resins containing specified alkyl sulphate(s) or their mixtures with calcium soaps, fatty alcohol(s), liquid paraffin, and scent; EP-111895 A of Jun. 27, 1984 describes skin care emulsions for applying to wet skin containing liquid oil, fatty acid soap and optionally ethoxylated alkyl-sulphate; DE3317909 A of Dec. 1, 1983 describe thick pearl gloss dispersions containing fatty acid glycol ester, alkyl sulphate or poly oxyalkylene alkyl sulphate, fatty acid dialkanolamide and water; DE3247992 A of Jul. 7, 1983 describes aqueous liquid skin cleaning compositions containing hydroxypropylated guar gum, paraffin sulphonate and alkyl sulphate; DE3206350 A of Sep. 23, 1982 describes ammonium alkyl-sulphate detergent, especially shampoo, compositions containing alkylene-di amine carboxylic acid derivative and carboxylic or amino acid; DE3205987 A of Sep. 9, 1982 describes stable, high-foaming liquid cleansing especially shampoo compositions containing ammonium alkyl sulphate, polyoxyalkylene ether and fatty acid di alkanolamide; GB1510452 A of May 10, 1978 describes cleaning composition for addition to lavatory flush water contains potassium permanganate and sodium alkyl sulphate; BE-846200 A of Dec. 30, 1976 describes liquid shampoo containing polyethoxylated alkyl sulphates, almost free of the non-ethoxylated alkyl sulphate;

Formulation Ingredient Types

In general, as noted, detergent surfactants derived from the present detergent alcohols can be combined with any one or more of the numerous adjuncts found in detergent applications. These include builders, conventional surfactants, enzymes, oxygen or chlorine bleaches, optionally but often preferably with activator(s) and/or catalysts, polymers, sequestrants, alkalinity systems, surfactants other than the detergent alcohol-derived surfactants, hydrotropes, thickeners, antifoams, optical brighteners, dyes, stabilizers, anti-caking agents, prills, speckles, clays, colorants and dyes, and perfumes. Surfactant systems known to benefit from the inclusion of divalent ions such as those of magnesium can also be used in the present context.

Formulation pH

Formulations herein can cover a wide spectrum of pH. When using one of the acid-sensitive surfactant derivatives of the present detergent alcohols, the practitioner will take care to avoid excessively acidic pH which may hydrolyse certain derivatives such as the alkyl sulphates. Nonionic derivatives, such as the alcohol ethoxylates, are well-known to be pH-stable. With the exception of the conditions under which hydrolysis of the surfactant or adjunct(s) is possible, compositions herein can include a wide range of pH, typically from about 2 to about 13, though this range is illustrative rather than being limiting.

Builders

Detergent surfactants derived from the present detergent alcohols can be combined with builders including inorganic and/or organic types. Inorganic builders include various water-soluble or hydrous silicates, sodium carbonate, sodium tripolyphosphate, zeolites such as A or P including the newer variations commercially available from Crosfield, PQ, Albermarle and others; and any other inorganic materials having water-softening action including the hydrous silicates of PQ corp. and the various delta-silicates or so-called "layer silicates" offered commercially by Hoechst and others. Other builders include the common sodium carbonate and sesquicarbonate, and "seeded" builder systems. Organic builders include nitrilotriacetic acid, citrate, tartrate succinates, carboxymethyloxysuccinates, 2,2'-oxydisuccinates, polyacetal carboxylates, and the like. Built formulations in the literature made with known alkyl sulphates include for example, granular as well as liquid types such as those of JP06033090 A of Feb. 8, 1994 describing liquid detergents for clothes, having high detergency and biodegradability containing alkyl sulphate having 8–10 carbon alkyl group or oleyl sulphate; or DE4023893 A of Jan. 30, 1992 describing an aqueous liquid bleaching washing composition with low biodegradability containing alkyl sulphate, oleic acid soap, saturated higher fatty acid soap, alkyl glucoside, alcohol ethoxylate, hydrogen peroxide and other components.

Enzymes

Detergent surfactants derived from the present detergent alcohols can be combined with enzymes including any kind of enzyme having a useful function in a detergent or cleaning agent, such as proteases, amylases, pullulanases, lipases, cellulases, keratinases, bleach-promoting enzymes, bleach-destroying enzymes and the like. Hydrolases such as proteases derived from b. subtilis are most common in practice.

Some of the enzymatic compositions include those derivable by substituting a surfactant derived from one of the present detergent alcohols in a formula such as that of any of the following patent publications: WO09700929 A1 of Jan. 9, 1997 describing a liquid detergent composition for pretreating fabrics comprising anionic surfactants comprising alkyl(alkoxy)sulphate(s) and tertiary amine; JP08256768 of Oct. 8, 1996 describing activation of glycosidase for cleaning of e.g. industrial tools comprises activation in presence of alkyl sulphate and/or alkyl sulphonate; EP-730024 A1 of Sep. 4, 1996 describing aqueous composition concentrates for cleaning medical and surgical instruments containing alkyl sulphate salt, solubiliser, alkanolamine and proteolytic enzyme; GB2298211 A of Aug. 28, 1996 describing cost-effective heavy duty liquid laundry detergents containing anionic alkyl sulphate(s) and alkyl poly ethoxylate sulphate(s), nonionic fatty alcohol ethoxylate(s) and protease in water-based carrier; WO9505447 A1 of Feb. 23, 1995 describing a granular detergent composition giving improved cleaning performance especially with respect to greasy and oily stains comprising secondary dialkyl sulphate surfactant, enzyme, per oxygen bleaching agent and a bleach activator e.g. alkyl oxy benzene sulphonate; WO9500625 A1 of Jan. 5, 1995 describing granular laundry detergent compositions comprising lipase, alkyl alkoxy sulphate or poly hydroxy fatty acid amide, and sodium nonanoyl oxy benzene sulphonate and sodium perborate; WO9424244 A1 of Oct. 27, 1994 describing high density granular detergent compositions comprising secondary alkyl sulphate surfactant which enhances removal of dirt from fabrics; WO9424243 A1 of Oct. 27, 1994 which describes free flowing granular detergent compositions coated with secondary alkyl sulphate surfactants which are environmentally friendly, giving improved soil removal during fabric washing; WO9424242 A1 of Oct. 27, 1994 describing free flowing detergent particles containing secondary alkyl sulphate surfactants said to be environmentally friendly showing increased compatibility with detergent enzymes and having greatly improved cold water solubility; WO9424241 A1 of Oct. 27, 1994 describing detergent compositions in stable liquid, gel, bar or granular form containing secondary alkyl sulphate and magnesium ions for better suds and cleaning; WO9424240 A1 of Oct. 27, 1994 describing a stable enzyme containing detergent in which presence of secondary alkyl sulphate surfactant enhances enzyme stability giving better cleaning, good for skin and more environmentally friendly; WO9424239 A1 of Oct. 27, 1994 describing calcium containing detergent compositions in stable liquid, gel or other forms where the presence of secondary alkyl sulphate enhances the removal of greasy stains and soils from fabrics, making them milder to the skin and more environmentally friendly; WO9208778 A1 of May 29, 1992 describing detergent compositions containing alkyl sulphate and subtilisin(s) or their variants which holds glutamic acid residue and/or alanine residue, to enhance performance of enzyme; DE4034840 A of May 7, 1992 describing stable easily manufactured enzymatic liquid washing compositions containing sodium fatty alkyl sulphate, soaps, ethanol, glycerol, and protease(s), amylase(s) and/or lipase(s); RD-315020 A of Jul. 10, 1990 describing granular high bulk density detergent compositions or components containing primary alkyl sulphate anionic detergent active material and sodium aluminosilicate; EP 181,212 A of May 14, 1986 describing stable liquid dishwashing detergent containing alkyl benzene sulphonate, alkyl sulphate, alkyl ethoxy sulphate, ethoxylated alcohol and betaine; EP 62,371 A of Oct. 13, 1982 describing liquid dishwashing compositions containing alkane sulphonate, ethoxylated alkyl sulphate and magnesium ions; and DE4139551 A1 of Jun. 3, 1993 describing preparation of surfactant powders by spray drying aqueous mixtures of alkyl sulphate, alkyl glycoside and inorganic carrier, used as premix for washing and cleaning compositions.

Oxygen or Chlorine Bleaches, optionally with activator and/or catalyst

Any of the surfactants derived from the Sasol detergent alcohols herein can be used in conjunction with bleach. Typical bleaches include hypochlorite or hypochlorite precursors and the various oxygen bleaches such as hydrogen peroxide or suitable sources of hydrogen peroxide nonlimitingly illustrated by sodium perborates, percarbonates and the like in their coated or noncoated forms. Any of these bleaches can further be combined with bleaching promoters, activators, catalysts and the like. Bleach activators commonly include tetraacetylethylenediamine for hydrophilic bleaching, nonanoyloxybenzenesulfonate or any C8 or higher long-chain oxybenzenesulphonate activator for hydrophobic bleaching, and mixtures of hydrophilic and hydrophobic bleach activators. Bleach catalysts include the transition metal types such as complexes of cobalt, manganese or iron with suitable ligands such as triazacyclononane. Oxaziridines, sulfominines or the like can also be used. Some illustrative bleaching compositions are:

JP08092593 A of Apr. 9, 1996 which describes bleaching detergent compositions comprising coated sodium percarbonate, organic peracid precursor and alkyl sulphate (s), having high storage stability and solubility; JP08143894 A of Jun. 4, 1996 describes bleaching detergent compositions having high storage stability and solubility comprising coated sodium percarbonate, organic peracid precursors and alkyl sulphate(s) and optionally containing e.g. aluminosilicate(s) and alkali metal silicate(s); JP08053695 A of Feb. 2, 1996 describes stable, high foaming bleaching detergent composition containing alkyl sulphonate or alkyl sulphate, di phenyl ether derivative(s), alkali, amine oxide and hypochlorite, e.g. for cleaning baths or toilets; EP-693549 A1 of Jan. 24, 1996 describing solid bleach activator compositions used in detergents i.e. laundry comprising a particulate bleach activator material co-agglomerated with alkyl sulphate, giving improved bleaching performance; SU1790218 A1 of Jan. 27, 1995 describing water-based liquid detergent for laundry operations including optical bleach, alkyl sulphate sodium salt, sodium adipate etc., providing reduced fabric shrinkage while retaining cleaning capability; WO9505447 A1 of Feb. 23, 1995 describing a granular detergent composition, giving improved cleaning performance especially with greasy and oily stains comprises secondary dialkyl sulphate surfactant, enzyme, per oxygen bleaching agent and a bleach activator e.g. alkyl oxy benzene sulphonate; US5389277 A of Feb. 14, 1995 describes powdered detergent compositions comprising secondary alkyl sulphate(s), builder(s), filler(s) and bleach compounds; JP02229898 A of Sep. 12, 1990 describes a bleaching detergent composition containing peroxide, activator forming organic peroxy acid containing cationic group, alkylbenzene sulphonate, alkyl sulphate and other components; SU1366512 A of Jan. 15, 1988 describes leaching alkylbenzene sulphonate(s) and alkyl sulphate(s) with aqueous sodium hypochlorite in presence of carboxylic acid of specified molecular weight; and SU1328373 A of Aug. 7, 1987 describes bleaching and bactericidal laundry formulation comprising di chloro-isocyanurate(s) and sodium alkyl sulphate as wetting agent.

Polymers

A wide range of polymers can be used in the instant compositions. The polymers are often water-soluble types, such as sodium polyacrylate, a common detergent adjunct. Polymers can be used for their well-known purposes such as thickening, builder action, stabilizer action, soil release effect, antiscaling effect, etc. Polymer containing compositions into which surfactants derived from Sasol detergent alcohols can be introduced as a substitute for one or more of the indicated surfactants include any of the following though these are for purposes of illustration only and are not limiting:

JP08092593 A of Apr. 9, 1996 describes bleaching detergent compositions comprising coated sodium percarbonate, organic peracid precursor and alkyl sulphate(s), having high storage stability and solubility; WO9637588 A1 of Nov. 28, 1996 describes liquid personal cleansing composition with good skin feel comprising short chain alkyl sulphate surfactant, water soluble auxiliary surfactant, cationic polymeric skin conditioner and water; WO9629982 A1 of Oct. 3, 1996 describes cosmetic and pharmaceutical preparations with improved foaming capacity containing a mixture of alkyl or alkenyl oligoglycoside and secondary alkyl sulphate salt; RU2054033 C1 of Feb. 10, 1996 describes cleaning compositions for textiles, rubber, plastics and polymer coatings containing water, ethanol, mono ethanolamine, sodium poly phosphate, gelatin and synthetic fatty alcohol(s) alkyl-sulphate; JP08143894 A of Jun. 4, 1996 describes bleaching detergent compositions having high storage stability and solubility comprising coated sodium percarbonate, organic peracid precursors and alkyl sulphate(s) and optionally contain e.g. aluminosilicate(s) and alkali metal silicate(s); JP06134770 A of May 17, 1994 describes cleaning resin compositions used to clean extruders or injection moulder comprising heat-resistant styrenic resin and poly alkylene oxide, and metal alkyl sulphate; JP04120012 A of Apr. 21, 1992 describes transparent gel detergent material having good feel containing anionic surfactant e.g. alkyl sulphate (s), polyhydric alcohol(s) e.g. glycerol, and carboxy vinyl polymer; WO9114759 A of Oct. 3, 1991 describes liquid personal cleansing compositions packaged in squeeze foamer container comprising surfactant e.g. alkyl-sulphate, water and viscosity enhancing polymer; EP-417501 A of Mar. 20, 1991 describes a mild shower gel and shampoo formulation containing neutralised surfactant combination of alkyl-poly glycol-ether-carboxylate, alkyl sulphate and fatty acid amido propyl betaine; EP-301412 A of Feb. 1, 1989 describes pourable, free-flowing antifoaming additives containing foam-inhibiting silicone and salts on cellulose-based substrate, and high-foaming anionic surfactant, e.g. alkyl sulphate; DE3610395 A of Oct. 1, 1987 describes an aqueous composition for skin cleaning and care containing alkyl amido betaine, amphoteric carboxy glycinate, alkyl sulphate salt, and poly-quaternary urea derivative; EP-111895 A of Jun. 27, 1984 describes skin care emulsions for applying to wet skin containing liquid oil, fatty acid soap and opt. ethoxylated alkyl-sulphate; US4233422 A of Nov. 11, 1980 describes acetal carboxylate polymer stabilised against alkali depolymerisation by addition of alkyl end groups using di alkyl sulphate and alkali metal hydride. See Surfactant Science Series, Vol. 67, Marcel Dekker, New York, 1997, incorporated by reference for its teachings on soil release polymers, hydrophobically modified polymers and other types of functional polymers which can be used in conjunction with surfactants derived from the present detergent alcohols. The well-known cellulosic types such as carboxymethylcellulose or more recently developed derivatives thereof can of course equally be used.

Preferred Formulation Combinations

Detergent surfactants derived from the present detergent alcohols can be combined into any of the following combinations:

Detergent Intermediates and Mixed Surfactants; surfactant plus builder, especially zeolite though others such as NTA or citrate can be useful; surfactant plus enzyme; surfactant plus bleach; surfactant plus functional polymer; surfactant plus low-level sequestrant or "chelant" (EDTA, DTPA or the like); surfactant plus alkalinity system; multi-surfactant: all-anionic; multi-surfactant: anionic/nonionic; multi-surfactant: anionic/cationic; multi-surfactant: anionic/nonionic/cationic; and fully formulated compositions in which any of the binary combinations are permuted.

Compositions herein can be sold in the fully-formulated or intermediate state; intermediate compositions include those which can conveniently be "made up" by admixture of additional adjuncts. Thus, a composition herein having minimal resemblance to a fully-formulated detergent can comprise about 99.9% of surfactant derived from a Sasol detergent alcohol in combination with about 0.1% of a process aid, colorant, or stabilizer-type adjunct.

Liquid detergents are growing in popularity: these are reviewed in detail in Surfactant Science Series, Volume 67, Marcel Dekker, New York, 1997 which includes extensive disclosure of the rheological aspects, phase equilibria, hydrotropy, use of polymeric stabilizers, use of nonaqueous surfactant systems; formulation of light-duty detergents; formulation of heavy-duty detergents; formulation of shampoos, liquid soaps and specialty cleaners, and the manufacture of liquid detergents. This reference is incorporated herein in its entirety. Owing to their superior properties, surfactants derived from the detergent alcohols herein are expected to be very suitable in liquid detergent applications. This reference provides an extensive entry into the art; just some of the patents teaching heavy-duty liquid detergents which may be combined with surfactants derived from the present detergent alcohols include: (all U.S. patents) U.S. Pat. Nos. 3,944,470; 4,111,855; 4,261,868; 4,287,082; 4,305,837; 4,404,115; 4,462,922; 4,529,525; 4,537,706; 4,537,707; 4,670,179; 4,842,758; 4,900,475; 4,908,150; 5,082,585; 4,959,179; 5,089,163; 5,071,586; 5,073,292; 5,082,585; 5,156,773; 5,269,960; 5,422,030; 5,431,842; 5,442,100; 4,394,305; 4,391,726; 4,397,776; 4,436,653; 5,035,838; 5,318,728; 5,338,486; 3,917,601; 3,950,331; 3,922,230; 4,285,841; 4,405,483; 4,654,159; 4,663,071; 4,689,167; 5,035,827; 5,159,041; 4,470,919; 5,250,212; 5,264,143; 5,275,753; 5,288,746; 5,431,848; 5,445,756; 4,140,641; 4,639,321; 4,751,008; 4,844,821; 4,844,824; 4,873,001; 4,922,852; 5,017,296; 4,452,717; 4,526,709; 4,530,780; 4,618,446; 4,793,943; 4,659,497; 4,871,467; 4,891,147; 5,006,273; 5,021,195; 5,147,576; 5,160,655; 4,647,393; 4,648,983; 4,655,954; 4,661,280; 4,690,771; 4,744,916; 4,753,750; 4,950,424; 5,004,556; 5,102,574; 3,959,230; 3,962,152; 4,372,882; 4,532,067; 4,551,506; 4,661,288; 4,661,287; 4,715,990; 4,676,921; 4,702,857; 4,721,580; 4,795,584; 4,883,610; 4,968,451; 4,999,128; 4,075,118; 4,732,694; 4,983,316; and 5,288,431. See the above-cited Surfactant Science series reference at pages 309–317 for a convenient summary of specific technologies (builders, enzymes, soil release agents etc.,) taught in the above-incorporated patents. Other consumer products requiring surfactant in which surfactants derived from the present detergent alcohols may be useful as a full or partial replacement or as an add-on include U.S. Pat. Nos. 4,933,103; 5,458,801; 4,824,604; 4,259,215; 4,869,843; 5,154,850; 5,200,236, 5,230,822; 4,783,281; 5,480,575; 5,230,822; 5,106,528; 5,073,285; 5,246,621; 5,089,162; 4,828,723; 4,797,225; 4,839,084; 4,753,748; 4,931,195; 4,889,652; 4,892,673; 4,244,840; 4,595,526; 4,230,590; 4,789,496; 4,741,842; 4,622,173; 3,951,879; 5,204,010; 5,310,508; 5,041,243; 5,053,159; 5,310,508; 5,496,490; 5,437,686; 5,480,586; 5,221,495; 5,221; though these are only a sampling. The disclosure of these and other patents cited herein provides an extensive illustration of adjunct materials which can be used singly or severally in conjunction with detergent surfactants derived from and of the instant detergent alcohols.

Formulation Ingredients in More Detail

Practical formulators can obtain extensive listings of commercially available detergent surfactants, detergent adjuncts and suppliers and complete formulations of cleaning products from the following references hereby incorporated in their entirety:

Industrial Surfactants, Second Edition, E. W. Flick, Noyes Publications, New Jersey, 1993, ISBN 0-8155-1332-1;

Advanced Cleaning Product Formulations, E. W.Flick, Noyes Publications, New Jersey, 1989, ISBN 0-8155-1186-8; Advanced Cleaning Product Formulations Vol. 2, E. W. Flick, Noyes Publications, New Jersey, 1994, ISBN 0-8155-1346-1; and Advanced Cleaning Product Formulations Vol. 3, E. W. Flick, Noyes Publications, New Jersey, 1995, ISBN 0-8155-1382-8.

In view of the disclosure hereinabove, the present invention can readily be practiced by the detergent formulator of ordinary skill; nonetheless, the invention will further be illustrated by the following nonlimiting examples. Percentages and proportions are by weight, unless otherwise indicated. Unless indicated to the contrary, Formulations add to 100 percent by weight. Any deficit can be made up by water and/or fillers such as sodium sulphate.

EXAMPLE 1

A cold water detergent for wool and delicate fabrics is as follows:

| | % wt. |
|---|---|
| Water | 55.9 |
| Amphoteric Sulphonate Surfactant (Miranol CS, Rhone Poulenc) | 10.0 |
| Na Alkyl Sulphate from Sasol C12/15 alcohol | 30.0 |
| Alkamide DC-212 alkanolamide (Rhine Poulenc) | 4.0 |
| Fluorescent Whitening Agent | 0.1 |

The ingredients are added in the order indicated. The mixture is heated to 50 deg. C. and mixed until clear. (See Flick cited supra, Vol. 3., p 115). Use of the alkyl sulphate from Sasol has the potential to improve cold water detergency performance and is expected to permit reduction in the amount of more expensive amphoteric.

EXAMPLE 2

An Enzymatic Heavy-Duty Laundry Detergent is as follows:

| | % wt. |
|---|---|
| Part A | |
| Water | 10.0 |
| Citrate | 5.0 |
| Linear Alkylate Sulphonate (Calsoft F-90, Pilot) | 8.0 |
| Part B | |
| Nonionic Ethoxylate (7 moles ethylene oxide added to Sasol C12/15 alcohol) | 6.0 |
| Monoethanolamine | 2.0 |
| Triethanolamine | 2.0 |
| Sodium Xylene Sulphonate | 3.0 |
| Sodium Alkyl (polyethoxy) sulphate (3 moles ethylene oxide added to Sasol C12/15 alcohol and sulphated) | 8.0 |
| Part C | |
| Na formate | 1.2 |
| Calcium Chloride | 0.2 |
| Enzymes | 0.4 |
| Colorant | 0.02 |
| Perfume | 0.3 |
| Water to 100% | Balance |

Sodium citrate is dissolved with stirring in water at 45–50 deg. C. The Calsoft is added. Part B is now mixed in the order listed. Part A is added to Part B. Sodium formate and calcium chloride are now added. The temperature is reduced to ambient. The enzymes are added (for example, protease from Novo). Colorant, perfume and water are added. The pH is adjusted to 10.0. (See Flick cited supra, Vol. 3., p 118).

The use of two or more surfactants derived from Sasol detergent alcohol (such as the nonionic ethoxylate and/or alkyl sulphate and/or alkyl polyethoxysulphate) produces excellent cleaning results. Sasol detergent-alcohol derived surfactants can similarly be used in a light-duty detergent such as that of U.S. Pat. No. 4,595,526 assigned to Colgate-Palmolive.

EXAMPLE 3

A Heavy-Duty Granular Laundry Detergent is described in EP 266,931 B assigned to Procter & Gamble, incorporated by reference. A detergent is made by substituting into the composition of EP 266,931 a similar weight of sodium alkyl sulphate made from Sasol detergent alcohol.

EXAMPLE 4

A Heavy-Duty Granular Laundry Detergent is described in EP 373,850 B assigned to Unilever, incorporated by reference. A detergent is made by substituting into the composition of EP 266,931 a similar weight of sodium alkyl sulphate made from Sasol detergent alcohol. The Sasol-derived alkyl sulphate is a substitute for the "PAS" primary alkyl sulphate of '850.

EXAMPLE 5

A Heavy-Duty Granular Laundry Detergent is described in EP 643,130 A assigned to Procter & Gamble, incorporated by reference. A detergent is made by substituting into the composition of EP 643,130 a similar weight of nonionic surfactant derived from Sasol detergent alcohol, as compared with the nonionic surfactants described in '130.

EXAMPLE 6

A Heavy-Duty Granular Laundry Detergent is described in EP 674,617 A assigned to Unilever, incorporated by reference. This detergent can contain a secondary alkyl sulphate and a zeolite such as zeolite A or zeolite "MAP". A detergent is made by substituting into the composition of '617 a similar weight of alkyl sulphate derived from Sasol alcohol, replacing the secondary alkyl sulphate. It is expected that the Sasol-derived surfactant incorporates well into zeolite-containing detergent compositions based on zeolites A, P or similar materials, especially when they have fine particle sizes. Suitable zeolites are commercially available from Joseph Crosfield & Co.

EXAMPLE 7

A Heavy-Duty Granular Laundry Detergent is described in EP 544,492 A assigned to Unilever, incorporated by reference. This detergent can contain an ethoxylated alcohol as nonionic surfactant and a zeolite such as zeolite A or zeolite "MAP". A detergent is made by substituting into the composition of '492 a similar weight of ethoxylated Sasol detergent alcohol, replacing the nonionic surfactant of '492. It is expected that the Sasol-derived surfactant incorporates well into zeolite-containing detergent compositions based on zeolites A, P or similar materials, especially when they have fine particle sizes. Suitable zeolites are commercially available from Joseph Crosfield & Co.

EXAMPLE 8

A Heavy-Duty Granular Laundry Detergent is described in U.S. Pat. No. 5,578,561 assigned to Kao Corp., incorporated by reference. This detergent can contain an ethoxylated alcohol as nonionic surfactant and an absorbent amorphous aluminosilicate. A detergent is made by substituting into the composition of '561 a similar weight of ethoxylated Sasol detergent alcohol, replacing the nonionic surfactant of '561. It is expected that the Sasol-derived surfactant incorporates well into the amorphous aluminosilicate-containing detergent compositions.

EXAMPLE 9

Softening Detergent (Softergent) is described in U.S. Pat. No. 5,221,495 assigned to Colgate-Palmolive, incorporated by reference. This detergent can contain a sodium alkyl polyethoxy sulphate (AEOS) wherein the alkyl is 12 to 15 carbon atoms and the polyethoxy is 3 ethylene oxide groups. A detergent is made by substituting the corresponding Sasol detergent alcohol derived material for the AEOS of '495. See particularly Examples 1, 2 and 3 of '495. These compositions further illustrate the combination of the Sasol-derived surfactant with polyacrylate polymers, clays, colorants, perfumes, silicone antifoams, and sodium tripolyphosphate.

EXAMPLE 10

A Softening Detergent (Softergent) is described in U.S. Pat. No. 5,221,495 assigned to Colgate-Palmolive, incorporated by reference. Sasol detergent alcohol derived surfactant is substituted into the formulation.

EXAMPLE 11

A detergent formula comprises:

| | wt % |
|---|---|
| Linear Alkyl Benzene Sulphonate | 15.0 |
| Alkyl Sulphate (from Sasol detergent Alcohol) | 3.0 |
| Sodium Tripolyphosphate | 15.0 |
| Sodium Carbonate | 7.5 |
| Sodium Silicate | 7.5 |
| Sodium Sulphate | 42.3 |
| Amylase/Protease Enzymes | 0.35 |
| Sodium Polyacrylate | 1.6 |
| Soil Release Polymer* | 1.0 |
| Perfume | 0.25 |
| Moisture | to 100% |

*U.S. Pat. No. 5,496,490, Colgate-Palmolive

In like manner, ethoxylated nonionic surfactant derived from Sasol detergent alcohol can be combined with ingredients such as those illustrated above, with or without the further addition of additional enzymes including lipases, cellulases and the like available from Novo Nordisk or from Genencor International.

From the above disclosure, it will be apparent that Sasol detergent alcohol can be very flexibly incorporated into a wide variety of detergents and cleaning products in the form of alkyl sulphate derivatives, alkoxylated nonionic derivatives and alkyl ethoxy sulphate derivatives. Moreover, compatibility with other detergent ingredients is at least as good as that obtained using conventional detergent alcohol as starting-material.

The compositions herein demonstrate multiple advantages, including superior storage stability for liquid formulas and superior dissolving and cool water performance. They are thus very inviting to the formulator of detergent products.

What is claimed is:

1. A detergent or cleaning composition comprising (a) an effective amount of a detersive surfactant selected from alkyl sulphates, alkylpoly(alkoxy)sulphates, alkylpoly(alkoxylates) and mixtures thereof, said surfactant incorporating at least one mole of the R-O-radical of an $R=C_9-C_{15}$ detergent alcohol of formula ROH, wherein R is mixtures of methyl branched and some linear chains, and said alcohol is further characterized in that it comprises the product of at least one Fischer-Tropsch process step or a oligomerization or dimerization process step, and at least one Oxo process step; and (b) one or more adjuncts at least partially contributing to the useful properties of the composition.

2. A detergent or cleaning composition according to claim 1 wherein the amount of said component, (a), is at least about 0.1% and the amount of said component (b) is at least about 0.1%.

3. A detergent or cleaning composition according to claim 2 wherein said component, (a), is an alkyl sulphate in acid-, sodium-, potassium-, lithium-, ammonium, calcium, magnesium or substituted ammonium salt form.

4. A detergent or cleaning composition according to claim 2 wherein said component, (a), is the alkoxylate of said detergent alcohol and wherein the alkoxylate is produced by at least one step selected from ethoxylation, propoxylation, and mixed alkoxylation and wherein said alkoxylate is non-capped or is capped using any suitable capping moiety.

5. A detergent or cleaning composition according to claim 2 wherein said component, (a), is a sulphated alkoxylate produced by at least one step selected from ethoxylation, propoxylation and mixed alkoxylation and at least one step selected from sulfation using any conventional sulfation reagent and wherein said component, (a), is in acid-, sodium-, potassium-, lithium-, calcium, magnesium, ammonium or substituted ammonium salt form.

6. A detergent or cleaning composition according to claim 2 wherein said component, (a), is a mixture of two or more of any of said component (a) derivatives.

7. A detergent or cleaning composition according to claim 2 wherein said component, (a), is a mixture of any of said recited component (a) derivatives in intimate admixture with fully linear analogs.

8. A detergent or cleaning composition according to claim 2 wherein said component, (b) is selected from the group consisting of inorganic builders, organic builders, water-soluble polymers, chelating agents, bleaches, bleach activators, bleach catalysts, detersive enzymes, enzyme stabilizers, perfumes, colorants, fluorescent whitening agents, solvents, hydrotropes, saccharide-derived surfactants, linear alkylbenzenesulphonates, abrasives, soaps, fatty acids, general-purpose stabilizers, processing aids, aesthetic speckles, clays, softening agents, silicones, antistat agents, conventional surfactants and mixtures thereof.

9. A detergent or cleaning composition according to claim 2 wherein said detergent has the form of a heavy-duty granular detergent.

10. A detergent or cleaning composition according to claim 2 wherein said detergent has the form of a heavy-duty liquid detergent.

11. A detergent or cleaning composition according to claim 2 wherein said detergent has the form of a light-duty granular detergent.

12. A detergent or cleaning composition according to claim 2 wherein said detergent has the form of a light-duty liquid detergent.

13. A detergent or cleaning composition according to claim 2 wherein said detergent has the form of a hard-surface cleaner.

14. A detergent or cleaning composition according to claim 2 wherein said detergent has the form of an automobile washing agent.

15. A detergent or cleaning composition according to claim 2 wherein said detergent has the form of a floor cleaner.

16. A detergent or cleaning composition according to claim 2 wherein said detergent has the form of a soap or syndet.

17. A detergent or cleaning composition according to claim 2 wherein said detergent has the form of a shampoo or personal cleansing detergent.

18. A detergent or cleaning composition according to claim 8 wherein said inorganic builder is a phosphate salt.

19. A detergent or cleaning composition according to claim 8 wherein said builder is phosphate-free.

20. A detergent or cleaning composition according to claim 8 wherein said builder is selected from silicates and aluminosilicates.

21. A detergent or cleaning composition according to claim 8 wherein said builder is selected from aluminosilicates.

22. A detergent or cleaning composition according to claim 8 wherein said builder is selected from amorphous aluminosilicates.

23. A detergent or cleaning composition according to claim 8 wherein said builder is selected from crystalline aluminosilicates.

24. A detergent or cleaning composition according to claim 8 wherein said builder is selected from zeolites A, P and maximum aluminum P.

25. A detergent or cleaning composition according to claim 8 wherein said builder is sized to improve surfactant adsorption or has mean particle size in the range from about 0.01 micron to about 10 micron.

26. A detergent or cleaning composition according to claim 8 wherein said builder is zeolite P.

27. A detergent or cleaning composition according to claim 8 wherein said bleach is selected from sodium perborate monohydrate, sodium perborate tetrahydrate, sodium percarbonate and mixtures thereof.

28. A detergent or cleaning composition according to claim 1 wherein said component, (b) comprises (i) from about 0.1% to about 80% of a builder;

(ii) from about 0.1% to about 30% of a bleach or bleach/bleach adjunct mixture;

(iii) from about 0.0001% to about 5% of detersive enzyme selected from the group consisting of proteases, amylases, lipases, cellulases, pullulanases, keratinases and mixtures thereof; and (iv) from about 0.1% to about 10% of a water-soluble polymer and (v) from 0% to about 30% of a conventional surfactant.

* * * * *